US008844516B2

(12) United States Patent
Jones et al.

(10) Patent No.: US 8,844,516 B2
(45) Date of Patent: Sep. 30, 2014

(54) HEATING APPARATUS USING SOLAR ENERGY AND METHOD OF HEATING USING SOLAR ENERGY

(75) Inventors: David Paul Jones, South Wales (GB); Reginald Geraint Brown, Berkshire (GB)

(73) Assignee: Tata Steel UK Limited, London (GB)

( * ) Notice: Subject to any disclaimer, the term of this patent is extended or adjusted under 35 U.S.C. 154(b) by 585 days.

(21) Appl. No.: 13/144,998

(22) PCT Filed: Jan. 25, 2010

(86) PCT No.: PCT/EP2010/000410
§ 371 (c)(1),
(2), (4) Date: Jul. 22, 2011

(87) PCT Pub. No.: WO2010/086126
PCT Pub. Date: Aug. 5, 2010

(65) Prior Publication Data
US 2011/0277745 A1    Nov. 17, 2011

(30) Foreign Application Priority Data

Jan. 29, 2009  (EP) ..................................... 09001201

(51) Int. Cl.
*F24J 2/42* (2006.01)
*F24D 11/00* (2006.01)
*F24D 11/02* (2006.01)
*F24D 5/12* (2006.01)
*F24D 5/00* (2006.01)

(52) U.S. Cl.
CPC .......... *F24D 11/0264* (2013.01); *F24D 11/009* (2013.01); *Y02B 10/70* (2013.01); *F24D 11/0285* (2013.01); *F24D 11/007* (2013.01); *Y02B 30/126* (2013.01); *F24D 2200/12* (2013.01); *Y02B 10/20* (2013.01); *F24D 5/12* (2013.01); *F24D 2200/14* (2013.01); *Y02B 30/12* (2013.01); *Y02B 30/123* (2013.01); *F24D 5/005* (2013.01)
USPC ........... 126/613; 126/628; 126/629; 126/617; 126/714

(58) Field of Classification Search
CPC ................... F24D 11/007; F24F 5/0046; F24F 2005/0064; Y02B 10/20; Y02B 10/70; Y02B 30/126; Y02E 10/40; Y02E 10/44; Y02E 60/142; Y02E 60/145; Y02E 70/30
USPC .......... 126/585–587, 613, 617, 628, 629, 714
See application file for complete search history.

(56) References Cited

U.S. PATENT DOCUMENTS 3,981,445 A * 9/1976 Custer ........................... 126/585
4,029,080 A * 6/1977 Warren .......................... 126/643
(Continued)

FOREIGN PATENT DOCUMENTS

DE    102005029465 A1   12/2006
FR         2476806 A1    8/1981
(Continued)

OTHER PUBLICATIONS
International Application No. PCT/EP2010/000410 (published as WO 2010/086126 A1) International Search Report dated May 4, 2010.
(Continued)

*Primary Examiner* — Jorge Pereiro
(74) *Attorney, Agent, or Firm* — Novak Druce Connolly Bove + Quigg LLP

(57) ABSTRACT

This relates to a heating device including a solar energy collector, the solar energy collector transferring collected solar energy to outside air. First collector panels are used to heat outside air which heated air is led to a heater, for example a space heater. Second collector panels are used to transfer solar energy to air led to a heat exchanger of a heat pump. The heat pump transfers the extracted heat to heat storage. The stored heat is added to the air coming from the first collector panels if the temperature of the air coming from the first collector panels is below a predetermined temperature.

19 Claims, 1 Drawing Sheet

(56) References Cited

U.S. PATENT DOCUMENTS

| | | | | |
|---|---|---|---|---|
| 4,054,124 A | * | 10/1977 | Knoos | 126/584 |
| 4,062,346 A | * | 12/1977 | Rapp et al. | 126/649 |
| 4,126,270 A | * | 11/1978 | Hummel | 126/631 |
| 4,143,815 A | * | 3/1979 | Meysenburg | 237/2 B |
| 4,147,300 A | * | 4/1979 | Milburn, Jr. | 126/613 |
| 4,197,830 A | * | 4/1980 | Wilson | 126/620 |
| 4,203,424 A | * | 5/1980 | Coxon et al. | 126/585 |
| 4,273,102 A | * | 6/1981 | Anthony | 126/591 |
| 4,281,639 A | * | 8/1981 | Kuronen | 126/629 |
| 4,291,833 A | * | 9/1981 | Franchina | 237/2 B |
| 4,295,518 A | * | 10/1981 | Rannenberg | 165/62 |
| 4,323,054 A | * | 4/1982 | Hummel | 126/631 |
| 4,343,296 A | | 8/1982 | Franchina | |
| 4,373,573 A | * | 2/1983 | Madwed | 165/236 |
| 4,441,484 A | | 4/1984 | Greiner | |
| 4,934,338 A | | 6/1990 | Hollick et al. | |
| 6,792,938 B2 | * | 9/2004 | Komano et al. | 126/597 |
| 7,677,243 B2 | * | 3/2010 | McClendon | 126/621 |
| 2004/0154615 A1 | * | 8/2004 | Komano et al. | 126/629 |
| 2005/0103327 A1 | * | 5/2005 | Lee et al. | 126/643 |
| 2007/0205298 A1 | * | 9/2007 | Harrison et al. | 237/2 B |
| 2008/0203866 A1 | * | 8/2008 | Chamberlain | 312/236 |
| 2009/0255646 A1 | | 10/2009 | Kodeda | |

FOREIGN PATENT DOCUMENTS

| | | | | |
|---|---|---|---|---|
| FR | 2554562 A1 | * | 5/1985 | F24D 11/02 |
| GB | 2053454 A | | 2/1981 | |
| WO | 7900874 A1 | | 11/1979 | |
| WO | 9625632 A1 | | 8/1996 | |
| WO | 2007058576 A1 | | 5/2007 | |

OTHER PUBLICATIONS

Wikipedia, "Heat pump", URL:<http://en.wikipedia.org/wiki/Heat_Pump>, retrieved from the Internet on May 28, 2014.

"How Does a Heat Pump Work? Everything you need to Know about its operation?", URL:<http://www.heatpump-reviews.com/heat-pump.html>, retrieved from the Internet on May 28, 2014.

* cited by examiner

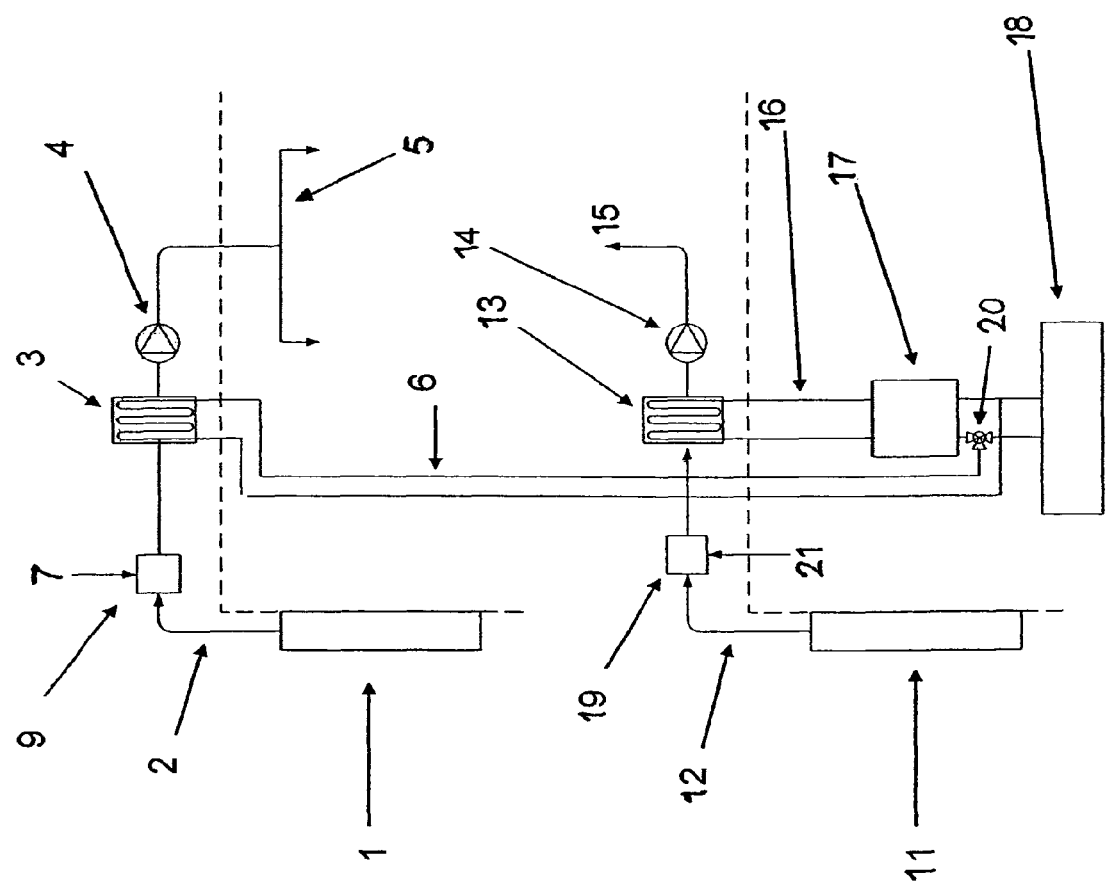

HEATING APPARATUS USING SOLAR ENERGY AND METHOD OF HEATING USING SOLAR ENERGY

CROSS-REFERENCE TO RELATED APPLICATIONS

This application is a §371 National Stage Application of International Application No. PCT/EP2010/000410, filed on 25 Jan. 2010, claiming the priority of European Patent Application No. 09001201.4 filed on 29 Jan. 2009.

The invention relates to a heating apparatus comprising solar energy collector means, the solar energy collector means transferring the collected solar energy to outside air passing through the solar energy collector means, and means to use the heat of the air coming from the solar energy collector means for heating.

Such solar energy collector means are known in the art, see for instance U.S. Pat. No. 4,934,338, and are commonly used to generate heated air for space heating or other indoor heating purposes like drying processes. In all kinds of buildings these collector panels can be integrated in the façade or roof so that large areas will be available to collect and transfer solar energy. The air-outlet duct of the solar energy collector means is connected to the interior of the building to introduce the heated air into the building. In this way a reduction in the costs for other means for heating can be achieved. However, most energy for interior space heating is needed in the morning hours when there is no or only a limited amount of solar energy available. This is a rather limiting factor for the use of these collector panels.

It is an objective of the present invention to provide a heating apparatus using the heat of the air coming from solar energy collector means for heating purposes throughout the day.

It is an objective of the present invention to provide a heating apparatus using the heat of the air coming from solar energy collector means for heating purposes that can easily be manufactured and at low costs.

It is another objective of the present invention to provide a heating apparatus provided with solar energy collecting means and heat storing means of a simple and reliable construction.

It is another objective of the present invention to provide a heating apparatus wherein heat stored in the heat storing means is added to the air used for heating if the temperature of that air is below a predetermined temperature.

It is still another objective of the present invention to provide a heating apparatus wherein heat is taken from the air used for heating if the temperature of that air is above a predetermined temperature and stored in the heat storing means.

According to a first aspect of the invention one or more of the above objectives are realized by providing a heating apparatus comprising solar energy collector means, the solar energy collector means transferring the collected solar energy to outside air passing through the solar energy collector means, means to use the heat of the air coming from the solar energy collector means for heating, a heat pump, a heat exchanger connected to the heat pump and heat storage means, wherein the solar energy collector means comprise at least one first collector panel and at least one second collector panel, the air coming from the at least one first collector panel is led to the heating means and the air coming from the at least one second collector panel is led to the heat exchanger connected to the heat pump, the heat pump transferring the heat extracted from the air to the heat storage means.

The term first collector panel and second collector panel may both mean a single collector panel or a plurality of collector panels.

The first collector panel used to heat air for the heating means has certain dimensions which are determined to a large extent by the heating power needed for heating purposes and the power that can be generated during the daylight hours. Increasing the dimensions of a collector panel beyond certain maximum dimensions will not substantially increase the time span that sufficient heat for heating purposes can be provided, whereas the possible peak power will be far over the maximum heat demand. Therefore, there is a certain optimal dimension for such collector panel, resulting in a limited period of sufficient power which will always be too short to cover the demand over the whole day. According the invention separate a second collector panel is provided, wherein the heat of the air passing through this second collector panel is extracted by means of a heat exchanger and heat pump and stored in heat storage means. The collected and stored heat is used during those periods of the day that the air passing through the first collector panel is not heated enough to meet the power demand for heating purposes.

By means of the heat pump and storage means it is possible to collect and store heat during all daylight hours, with the only restriction that the air temperature is not below a certain critical value, which is somewhere around the freezing temperature of water. As a consequence there is no limiting dimensional factor for the second collector panel as there is for the first collector panels.

The heating apparatus according to the invention with the combination of first and second collector panels, heat pump and heat storage means can supply the entire heating needs or a large proportion thereof.

The collector panel used in the heating apparatus according the invention defines an at least partly enclosed space and is provided with one or more solar energy absorbing sides, air-inlet openings connecting the outside environment with the at least partly enclosed space and an air-outlet duct connected to the at least partly enclosed space. According to a further embodiment the air-inlet openings connect to one or more air channels within the collector panel to guide the air along the solar energy collecting side of the panel and to control the air flow within the panel. These collector panels can be mounted against a side wall or an inclined side of a building or on the roof of a building or could be integrated with any of these sides of a building.

Although an air-flow will arise in the collector panel due to heat transfer in the collector panel this in most cases will not be enough to get a sufficient flow of air to the heating means that connect to the air-outlet duct of the first collector panel. In the air-outlet duct of the second collector panel the flow should be sufficient to have the air pass through the heat exchanger with at least a certain minimal velocity. According to a further aspect of the invention air suction means are provided to generate sufficient air-flow in the air-outlet duct of a collector panel. With these air suction means a continuous flow of air through the air-outlet duct can be established and regulated to maximum efficiency.

After passing of the air coming from the second collector panel through the heat exchanger the temperature of the air will in most cases be too low to be used for any heating purpose, such as space heating. Therefore, further means are provided to guide the air coming from the second collector panel after passing the heat exchanger to the outside environment. If the heat exchanger is placed near to where the air-outlet duct connects to the second collector panel, which for instance could be on or near the roof of a building, these further means can simple consist of a further outlet duct leading to the outside environment.

For heating purposes most heat is needed in the morning hours. The first collector panel will generate sufficient heat for heating purposes in the middle of the day and in most cases also part of the afternoon. To supply sufficient heat outside these hours the heat extracted from the air coming from the second collector panel and stored in the heat storing means is used.

According to a further aspect of the invention a further heat exchanger is positioned in the air-outlet duct connected to the first collector panel. By connecting the further heat exchanger to the heat storage means the stored heat is added to the air coming from the first collector panels and the additionally heated air is subsequently led to the heating means.

In order to be able to connect the further heat exchanger to the heat storage means for the periods of time that the additional heat is needed control means are provided to connect and disconnect the further heat exchanger to the heat storage means.

In the middle of the day the air coming from the first collector panel may be heated well above the temperature that is needed for the heating purpose. According the invention it is provided that during this period of time the further heat exchanger is connected by means of the control means to the heat storage means in a manner to subtract heat from the heated air coming from the first collector panel and store the subtracted heat in the heat storage means. At the end of said period of time the further heat exchanger is disconnected from the heat storage means. Later on in the day when additional heat is needed the heat exchanger is again connected to the heat storage means, but then in a manner that heat from the heat storage means is added to the air passing the heat exchanger.

If the temperature of the air coming from the first collector panel is higher than required for heating purposes but not sufficiently high to be able to store the subtracted heat in the heat storage means it also possible to use the heat pump, which however would require additional control means and possibly also another heat exchanger. In most cases such extra investments will not be economical since with the second collector panel and the heat pump circuit enough additional heat can be collected and stored.

According to a further aspect of the invention air-flow control means are provided in the air-outlet duct connected to the second collector panel arranged to add a further air-flow to the air-outlet duct connected to the second collector panel upstream of the heat exchanger. In a preferred embodiment the air-flow control means are arranged to add exhaust air coming from the heating means to the air-outlet duct connected to the second collector panel. The temperature of the exhaust air resulting from the heating process, for instance space heating, is still relatively high and can be used to mix with the air coming from the second collector panel before it passes the heat exchanger to raise the temperature of that air. By raising the air temperature the efficiency of the heat pump system will be improved. Depending on the kind of heating process and the amount of exhaust air resulting from the heating process, the air-flow control means may also be adjusted so that for a period of time only exhaust air from a heating process is led through the air-outlet duct upstream of the air-flow control means.

According to a further aspect the invention also a method of heating is provided using outside air passing through solar energy collector means, the method comprising the steps of:

passing air coming from at least one first collector panel of the solar collector means to heating means, extracting heat by means of a heat pump from air coming from at least one second collector panel of the solar collector means, and transferring the extracted heat to heat storage means.

Preferably the method comprises the further steps of:

adding heat to or taking heat from the air coming from the first collector panel to the heating means by means of a heat exchanger positioned in the air-flow coming from the first collector panel, wherein the heat exchanger is connected to the heat pump and/or the heat storage means.

Additionally it is provided that exhaust air coming from the heating means is added to the air coming from the second collector panel upstream of the point where heat is extracted by means of the heat pump.

The invention will be further explained on hand of the example shown in the drawing, in which schematically a circuit is shown with a first collector panel connected to a space heating system and a second collector panel with heat exchanger means connected to a heat pump and heat storage means.

In the drawing a first collector panel 1 is shown placed against a building structure, wherein the building structure is schematically indicated with a truncated line. The collector panel 1 is for instance a metal collector panel with perforations as air-inlet openings. Dependent on the application of the collector panel it is also possible to use a collector panel with other openings than the perforations referred to as air-inlet openings. The collector panel 1 can be a separate panel mounted against a side of a building structure or integrated with the building structure and oriented to receive solar energy as much as possible.

An air-outlet duct 2 is connected to the top of first collector panel 1 and leads the heated air from the first collector panel 1 to a space heating system 10. A fan 4 is placed in the air-outlet duct 2 to generate sufficient air flow in air-outlet duct 2 to feed the space heating system 5.

A second collector panel 11 is provided with an air-outlet duct 2 connected to the top of the second collector panel 11 and leading the air to a heat exchanger 13. The heat exchanger 13 is connected by means of pipes 16 to a heat pump 17 and heat pump 17 is connected to heat storage means 18. At the downstream side of heat exchanger 13 a fan 14 is placed in outlet duct 15 to get sufficient air-flow through heat exchanger 13. After the air is drawn through heat exchanger 13 the air is led to the outside environment through outlet duct 15.

By using a heat pump 17 it is possible to extract energy from air led or drawn through heat exchanger 13 over a temperature range starting at a temperature well below the temperature of heated air that will be suitable for direct heating applications. In this respect the term heated air is to be interpreted accordingly.

The heat storage means 18 can for example comprise an insulated container wherein a liquid medium, such as water, can be kept at an elevated temperature during a period long enough to be able to use it when it is needed. If the stored energy is to be used for space heating the stored energy should be available during at least the morning hours when in most cases the heat demand is at a maximum and heating by using direct heated air is not yet possible. Later in the day and in the evening it will in most cases again be necessary to use the stored heat. The amount of stored heat should also be sufficient to bridge this period which by using the energy collecting, extracting and storage means as proposed can easily be realized.

The circuit further comprises a heat exchanger 3 which is directly connected to the storage means 18 by pipes 6 and a control valve 20 such that, if necessary, heat stored in storage means 18 can be added to the air flowing into the building via the space heating system 5. If the temperature of the air coming from the first collector panel 1 is above the temperature needed for the space heating system 5 heat may be subtracted from the air by means of heat exchanger 3 and stored in heat storage means 18.

In air-outlet duct 12 connected to the second collector panel 11 air-flow control means 19 are provided which are used to introduce exhaust air coming from the interior environment, indicated with arrow 21, into the air-flow which is led through heat exchanger 13 which is connected to heat pump 17. This will only be done when the temperature of the heated air coming from collector panel 11 is below the temperature of the exhaust air.

The air-flow control means 9 provided in air-outlet duct 2 coming from first collector panel 1 and leading to heat exchanger 3 are used to introduce outside air, indicated with arrow 7, into air-outlet duct 2 if the temperature of the heated air coming from the first collector panel 1 should be lowered to control the space heating and to supply sufficient fresh outside air in the building.

The invention claimed is:

1. Heating apparatus comprising:
    a solar energy collector, the solar energy collector for transferring collected solar energy to outside air passing through the solar energy collector, wherein the solar energy collector comprises at least one first collector panel and at least one second collector panel, each collector panel respective defining an at least partially enclosed space and has one or more solar energy absorbing sides, air-inlet openings connecting outside environment with the at least partially enclosed space and an air-outlet connected to the at least partially enclosed space;
    a heat pump having a condenser side and an evaporator side,
    a first heat exchanger having an air inlet, an air outlet, a heat exchange medium inlet, and a heat exchange medium outlet,
    a second heat exchanger for extracting heat from the air from the second heat collector panel, said second heat exchanger connected to the heat pump evaporator side as the heat source for the heat pump, and
    heat storage means, connected to the heat pump condenser side to receive heat from the heat pump, the heat pump for transferring heat, extracted from the air by the second heat exchanger, from the second heat exchanger to the heat storage means;
    means for leading the air coming from the at least one first collector panel to a space heater for using the heat of air coming from the at least one first collector panel for heating, said means for leading air comprising a first air outlet duct for leading air from the first collector panel to the first heat exchanger air inlet for heat exchange with heat transfer medium, and means for leading the air from the first heat exchanger air outlet to the space heater;
    the first heat exchanger heat exchange medium inlet and heat exchange medium outlet directly connect by pipes for passing the heat exchange medium to and from the heat storage means; and
    means for leading the air coming from the at least one second collector panel to the second heat exchanger connected to the heat pump, comprising an air-outlet duct for leading air from the second collector panel to the second heat exchanger.

2. Apparatus according to claim 1, wherein the air-inlet openings connect to one or more air channels within the at least one collector panel.

3. Apparatus according to claim 1, wherein air suction means are provided to generate an air-flow in at least one said air-outlet duct.

4. Apparatus according to claim 3, wherein the second heat exchanger of the heat pump is positioned in the air-outlet duct connected to the second collector panel.

5. Apparatus according to claim 4, comprising means for guiding the air coming from the second collector panel after passing the heat exchanger to the outside environment.

6. Apparatus according to claim 1, wherein the first heat exchanger connected by said pipes to the heat storage means is positioned in the air-outlet duct connected to the first collector panel for adding stored heat from the heat storage means to air coming from the first collector panels.

7. Apparatus according to claim 6, wherein a controller is provided to connect and disconnect the first heat exchanger to the heat storage means.

8. Apparatus according to claim 7, wherein the controller and the first heat exchanger are arranged to add heat to or to take heat from the air coming from the first collector panel.

9. Apparatus according to claim 1, wherein air-flow control means are provided in the air-outlet duct connected to the second collector panel arranged to add a further air-flow to the air-outlet duct connected to the second collector panel upstream of the heat exchanger.

10. Apparatus according to claim 9, wherein the air-flow control means are arranged to add exhaust air coming from the heating means to the air-outlet duct connected to the second collector panel.

11. Method of using the apparatus of claim 1 for heating using outside air passing through a solar energy collector, the method comprising the steps of:
    passing air coming from at least one first collector panel of the solar collector means to a space heater through a means for leading the air coming from the at least one first collector panel to the space heater for using the heat of air coming from the at least one first collector panel for heating, said means for leading air comprising a first air outlet duct for leading air from the first collector panel to the first heat exchanger air inlet for heat exchange with heat transfer medium, and means for leading the air from the first heat exchanger air outlet to the space heater,
    passing air coming from at least one second collector panel of the solar collector through means for leading the air coming from the at least one second collector panel to a second heat exchanger connected to the heat pump, comprising an air-outlet duct for leading air from the second collector panel to the second heat exchanger, transferring heat from the second heat exchanger to a heat pump, extracting the heat from the second heat exchanger by means of the heat pump, and
    transferring the extracted heat from the heat pump to heat storage means.

12. Method according to claim 11, comprising the further steps of:
    adding heat to or taking heat from the air coming from the first collector panel to the heater using the first heat exchanger positioned in the air-flow coming from the first collector panel, wherein the heat exchanger is connected to the heat pump and/or the heat storage means.

13. Method according to claim 11, wherein exhaust air coming from the heater is added to the air coming from the second collector panel upstream of where heat is extracted by the heat pump.

14. Method according to claim 11, wherein air coming from the at least one first collector panel is led to the heating means and simultaneously the air coming from the at least one second collector panel is led to the second heat exchanger connected to the heat pump, the heat pump transferring the heat extracted from the air to the heat storage means.

15. Method according to claim 11, wherein the heat stored in the heating storage means is added to the air used for heating the space heater if the temperature of that air is below a predetermined temperature.

16. Apparatus according to claim 1, wherein a controller is provided to connect and disconnect the first heat exchanger to the heat storage means.

17. Apparatus according to claim 16, wherein the controller and the first heat exchanger are arranged to add heat to or to take heat from the air coming from the first collector panel.

18. Apparatus according to claim 17, wherein air-flow control means are provided in the air-outlet duct connected to the second collector panel arranged to add a further air-flow to the air-outlet duct connected to the second collector panel upstream of the heat exchanger.

19. Apparatus according to claim 1, wherein the heat storage means comprises an insulated container for containing water.

\* \* \* \* \*